April 2, 1935. LE ROY H. HOFFER 1,996,724
BRAKE
Filed June 16, 1930 2 Sheets-Sheet 1

Inventor
LeRoy H. Hoffer.
By his Attorneys

April 2, 1935. LE ROY H. HOFFER 1,996,724
BRAKE
Filed June 16, 1930 2 Sheets-Sheet 2

Inventor
LeRoy H. Hoffer.
By His Attorneys

Patented Apr. 2, 1935

1,996,724

UNITED STATES PATENT OFFICE 1,996,724

BRAKE

Le Roy H. Hoffer, Brooklyn, N. Y., assignor to Metropolitan Engineering Company, Brooklyn, N. Y.

Application June 16, 1930, Serial No. 461,306

9 Claims. (Cl. 188—78)

This invention relates to a brake and more particularly to a brake for motor vehicles.

Objects of the invention are to provide a brake and a brake mechanism that enables the braking effect to be easily applied and maintained; to provide a brake mechanism by which uniform brake pressure may be applied throughout the braking surfaces and to provide a brake mechanism in which the braking pressure may be uniformly balanced throughout the surface of the brake drum. With these and other objects in view which will more fully appear from the following description, the invention comprises the brake and the braking mechanism as described in the following specification and claims.

Various features of the invention are illustrated in the accompanying drawings, in which—

Figure 1:
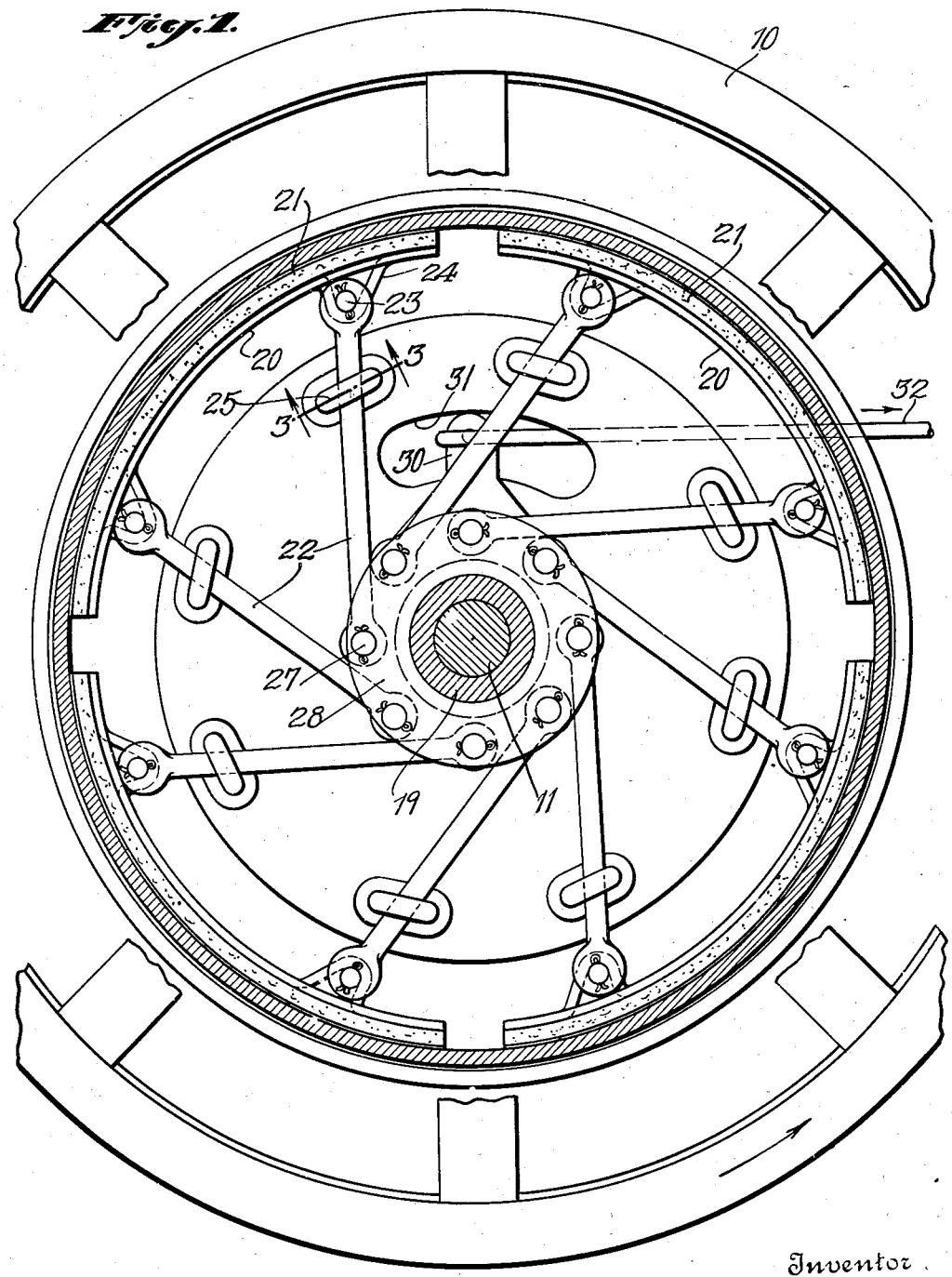
Fig. 1 is a front or face view of a wheel and a brake embodying the preferred form of the invention, a part being broken away to show portions of the brake mechanism in section.
Figure 2:
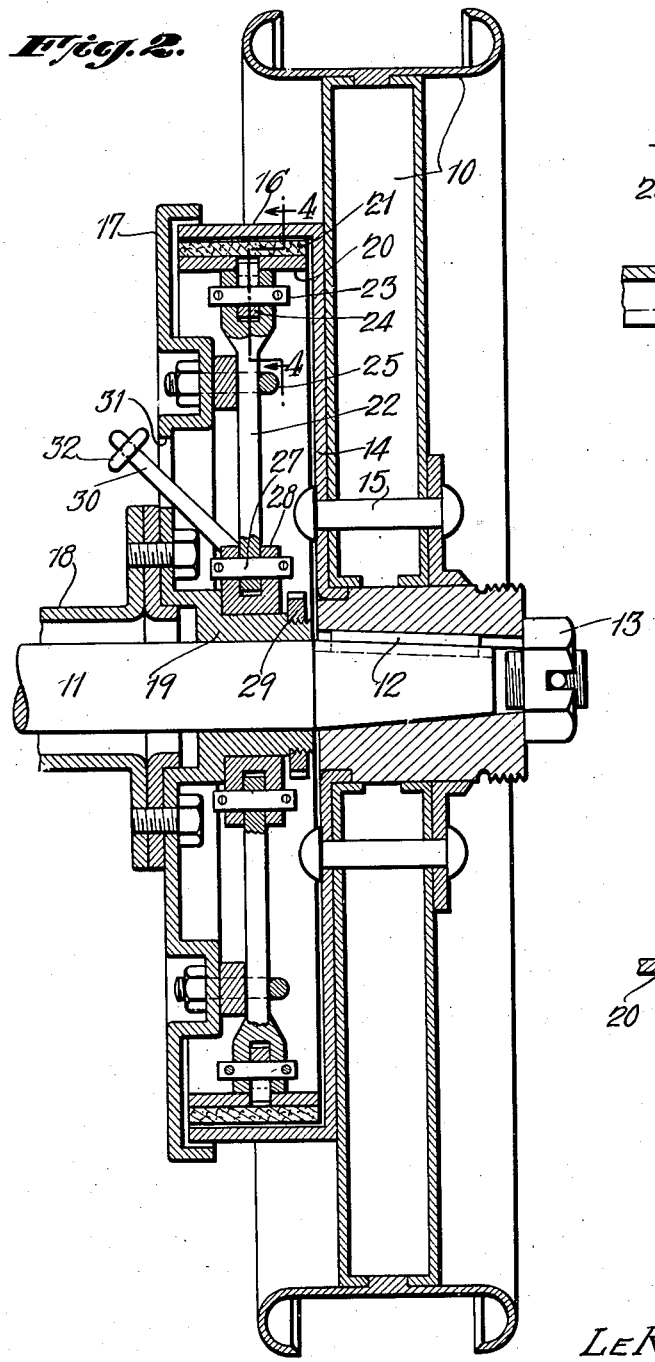
Fig. 2 is a sectional view taken longitudinally of the axis of the wheel.
Figure 3:
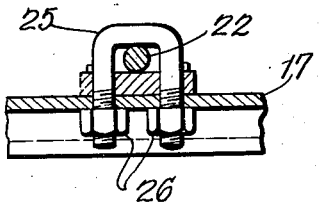
Fig. 3 is a detailed sectional view of a portion of the brake mechanism taken on the line 3—3 of Fig. 1.
Figure 4:
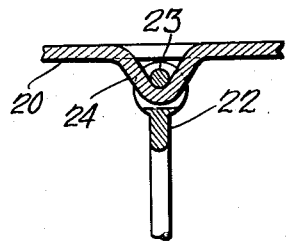
Fig. 4 is a detailed sectional view of a part of the brake mechanism taken on the line 4—4 of Fig. 2.

The brake mechanism of the present invention may be applied to any suitable type of wheel. In the embodiment shown in the accompanying drawings, the brake is illustrated as applied to a wheel 10 mounted on a rotating axle 11 and keyed thereto by means of a key 12. The wheel 10 is secured to the axle 1 by means of a nut 13. The brake drum 14 is secured to the wheel 10 by means of bolts or rivets 15 and has an annular flange 16 that forms the braking surface of the brake drum. The brake drum rotates with the wheel 10 and in close proximity to a stationary plate 17 that is bolted or secured to the axle housing 18 and has a hub 19 within which the axle 11 is rotatably supported. A number of brake bands 20 are positioned adjacent the inner surface of the flange 16 of the rotating brake drum and mounted in such a way that they may be moved outwardly to bring the friction surfaces 21 on the outer surface of the brake bands tightly against the inner surface of the flange 16. Any suitable number of brake bands 20 may be employed, four being shown in the accompanying drawings by way of illustration.

It is preferred also to have the brake bands arranged symmetrically about the axis of the wheel 10 or arranged in such a manner as to apply a balanced pressure to the brake drum. The brake bands 21 are each supported by a pair of links 22 each of which is secured at its outer end to a pin 23 that is inserted in a loop 24 formed on the inner surface of the brake band 20. The loops 24 are spaced circumferentially so that when the ends of the links 22 are forced outwardly the brake bands 20 will be uniformly pressed against each of the rotating brake flanges 16 and will accommodate their surfaces to the flange. The links 22 are secured at a point intermediate their lengths in the fixed or stationary plate 17 by means of a yoke 25 that encloses the respective links 22 and is secured to the plate 17 by means of nuts 26. The inner ends of the links 22 are secured by means of pins 27 to an actuating member or ring 28 that is rotatably mounted in a groove on the stationary hub 19 and is secured in position thereon by means of a retaining ring 29. The actuating member or ring 28 may be shifted to angular positions on the hub 19 by means of an arm 30 that extends sidewise through an opening 31 in the brake plate 17 and is secured at its outer end to a link 32 connected to the brake pedal of the vehicle.

When the link 32 is pulled in the direction of the arrow in Fig. 1 it shifts the actuating member 28 in a clock-wise direction thereby turning the links 22 in the yoke 25 as a pivot to a position more nearly approaching a radial position. This serves to force the brake bands 20 outwardly. The effect of this movement of the links 22 is to create pressure in the nature of a toggle thus exerting a proportionately great force on the brake bands 20. The outward inclination of the links 22 from a radial direction is practically opposite to the direction of rotation of the wheel 10 as indicated by the arrow in Fig. 1, so that the frictional effect of the rotation of the brake drum flange 16 on the brake bands 20 is to tend to move the latter in such a direction as to rotate the links 22 towards a radial position and thus increase the pressure. This facilitates the application and maintenance of the braking pressure although the action of the yoke 25 of the actuating member 28 is such as to prevent an undue action of this nature and to maintain the application of the braking pressure always under the control of the driver.

Through the above invention also the brake bands 20 are moved outwardly uniformly at two points so that the braking pressure may be made uniform throughout the entire surface of the brake band, thus providing a more uniform wear and a more effective braking action.

What I claim is:—

1. A brake which comprises a brake drum rotatable with a wheel, a brake band having an arcuate surface to engage the surface of said brake drum, an actuating member movable angularly of the axis of said brake drum, links inclined from said actuating member in a direction opposite to the rotation of said brake drum to said brake band, means for holding said links at a fulcrum point between said band and said actuating member against rotation about the axis of said drum while permitting longitudinal sliding movement whereby said links swing about said fulcrum point toward a radial position as said actuating member rotates counter to the direction of rotation of said wheel, said brake bands being supported by said links.

2. A brake mechanism for vehicle wheels which comprises a brake drum, segmental brake bands movable outwardly against an inner annular surface of said brake drum, a ring mounted centrally of said brake drum and movable to angular positions, links connecting said ring to said brake bands, said links being inclined from said actuating member in a direction opposite to the rotation of said brake drum and means for holding said links at a fulcrum point between said brake bands and said ring against rotation about the axis of said drum while permitting sliding movement longitudinally of said links whereby said links swing about said fulcrum point toward a radial position as said actuating member rotates counter to the rotation of said wheel, said brake bands being supported by said links.

3. A brake mechanism for vehicle wheels which comprises a brake drum having an annular braking surface, segmental brake bands fitting said annular braking surface, links connected at one end to said brake bands and extending inwardly at an angle to the radius of said brake band, means for holding said links at a fulcrum point between said band and the inner end of said link against rotation about the axis of said drum while permitting a sliding movement longitudinally of said links, and means acting on the inner ends of said links for tilting them about said pivotal point, said brake band being held against rotation about the axis of said drum solely at said fulcrum points.

4. A brake mechanism for vehicle wheels which comprises a rotating brake drum having an annular braking surface, segmental brake bands fitting said annular braking surface, a pair of links for each of said brake bands one end of each link of said pair being connected to said brake band at a circumferential distance from the other, an inner annular member movable relatively to said brake bands and means for holding said links at a fulcrum point between said brake bands and said inner annular member against rotation about the axis of said drum while permitting the sliding movement longitudinally of said links whereby said links swing about said fulcrum point toward or from a radial position as said actuating member rotates in one direction or the other, said brake band being held against rotation about the axis of said drum solely at said fulcrum points.

5. A brake mechanism for vehicle wheels which comprises a rotating brake drum having an annular braking surface, segmental brake bands fitting said annular braking surface, each of said brake bands having a pair of links connected thereto at longitudinally spaced points, an inner actuating member secured to said links centrally of said brake bands and means for pivotally holding said links intermediate their ends against rotation about the axis of the drum while permitting sliding movement longitudinally of said links whereby said links may swing about said pivotal point as said inner actuating member is rotated in one direction or the other about the axis of said brake drum, said brake band being held against rotation about the axis of said drum solely at said fulcrum points.

6. A brake mechanism for vehicle wheels which comprises a brake drum having an annular inner braking surface, segmental brake bands fitting said annular braking surface, links connected at one end to said bands, securing means fixed to the other ends of said links and rotatable on the axis of said brake drum and yokes for slidably holding said links at a fulcrum point between said brake bands and said rotatable securing means whereby said links may be rotated toward or from a radial position as said rotatable securing means rotates in one direction or the other about the axis of said brake drum, said brake band being held against rotation about the axis of said drum solely at said fulcrum points.

7. In a device of the class described, the combination of a drum, a support member, a plurality of segmental shoes coacting with said drum and free to move radially and circumferentially with respect thereto, an actuating member rotatably mounted on said support, links pivotally mounted on said support and pivotally connected to said shoes and to said actuating member, said links supporting said shoes for radial and circumferential movement, and means for rotating said actuating member, the pivotal connection for said links to said shoes and to said actuating member being at all times on opposite sides of the radial planes of the pivots for said links to said support.

8. In a device of the class described, the combination of a support member, a plurality of actuated members free for radial and circumferential movement, an actuating member rotatably mounted on said support, links pivotally and slidably mounted on said support and pivotally connected to said actuated members and to said actuating member, said links supporting said actuated members for radial and circumferential movement, and means for rotating said actuating member, the pivotal connection for said links to said actuated members being at all times on opposite sides of the radial planes of the pivots for said links to said support.

9. In a mechanism of the class described, the combination of a support member, actuated members free for radial and circumferential movement, an actuating member rotatably mounted on said support member, means for actuating said actuating member, and links pivotally and slidably mounted on said support and pivotally connected to said actuating member and to said actuated members, said links supporting said actuated members for radial and circumferential movement.

LE ROY H. HOFFER.